UNITED STATES PATENT OFFICE.

ROBERT L. JOHNSTONE, OF GLENRIDGE, NEW JERSEY.

PERMANENTLY PLIABLE AND ADHESIVE COMPOUND FOR INSULATING AND OTHER PURPOSES.

No. 832,610.  Specification of Letters Patent.  Patented Oct. 9, 1906.

Application filed May 14, 1903. Renewed March 9, 1906. Serial No. 305,130.

*To all whom it may concern:*

Be it known that I, ROBERT L. JOHNSTONE, a citizen of the United States, residing in Glenridge, county of Essex, State of New Jersey, have invented certain new and useful Improvements in Permanently Pliable and Adhesive Compounds for Insulating and other Purposes, of which the following is a specification.

The object of this invention is to produce a compound specially adapted for uses in the arts which require great adhesiveness and cohesiveness with permanent flexibility, as in the insulation of electric wires having short bends, in the preparation of adhesive plasters, and the like, and in other like instances. For such uses the compound employed should not only have the particular degree of adhesiveness required, but that the flexibility of the compound may not decrease with time by reason of the drying out or oxidation of the substance the compound must be practically non-oxidizable, neutral to all substances to the action of which it is likely to be subjected, free from all volatile constituents, and in all other respects practically unchangeable under all ordinary conditions of temperature. At the same time its fusing-point should not be so high as to make it impracticable to apply the compound to the purposes for which it is intended.

It has been found that a compound which answers in a marked degree all of these requirements may be produced by combining what is known in the arts as "gutta-percha gum," or, more accurately, the resin of the gutta-percha of commerce, as distinguished from crude gutta-percha, with a wax which has a comparatively high melting-point. As is well understood by those skilled in the use of gutta-percha, gutta-percha resin is a soft sticky substance which remains permanently soft and sticky at a normal temperature and melts at a temperature but slightly above the normal. This substance, therefore, possesses some of the characteristics necessary to the production of the desired compound; but with it must be combined some other substance which shall raise the melting-point of the compound above that of the gutta-percha resin, shall give the necessary degree of hardness or body to the compound, and shall enhance rather than diminish the desirable qualities of the gutta-percha resin. Such a substance is a substance of resinous or waxy nature, and it is believed that the best results are produced with a vegetable wax, and particularly with a vegetable wax known upon the market as "carnauba-wax" or "Brazil wax," obtained from the Brazilian wax palm. This wax melts only at a temperature very much above the normal, approaching 400° Fahrenheit. Consequently when the gutta-percha resin and this wax have been melted together and combined the resulting compound has a melting-point considerably above that of the gutta-percha resin alone, but otherwise retains the desirable characteristics of such resin, the adhesiveness and pliability of the compound being even greater than that of the gutta-percha resin alone. Furthermore, the compound does not harden from exposure to the air, but retains its softness and flexibility, as well as its tenacity. The consistency of the compound may be varied according to the requirements of the different uses to which it is put by varying the proportion of the ingredients.

In practice the quantity of wax in the compound varies from about ten percentum to fifty percentum of the whole, the larger percentum of wax making the compound firmer and adapting it particularly for use as an insulating compound for short-bend insulation, while the smaller percentum of wax makes the compound more suitable for use in an adhesive plaster or for other like purposes.

It will be understood that not only can the proportions of the ingredients be varied for different results according to the intended use of the compound, but that the compound is capable of use either by itself or in combination with other materials, also according to the intended use.

I claim as my invention—

1. A permanently pliable and adhesive compound consisting of gutta-percha resin and a waxy substance having a relatively high melting-point.

2. A permanently pliable adhesive compound consisting of gutta-percha resin and a vegetable wax having a relatively high melting-point.

3. A permanently pliable adhesive compound consisting of gutta-percha resin and carnauba-wax.

This specification signed and witnessed this 12th day of May, A. D. 1903.

ROBERT L. JOHNSTONE.

In presence of—
ANTHONY N. JESBERA,
M. A. BRAYLEY.